(12) United States Patent
Tokuda

(10) Patent No.: US 10,089,102 B2
(45) Date of Patent: Oct. 2, 2018

(54) INFORMATION PROCESSING APPARATUS, METHOD, AND PROGRAM

(71) Applicant: CANON KABUSHIKI KAISHA, Tokyo (JP)

(72) Inventor: Akihiko Tokuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 15/206,451

(22) Filed: Jul. 11, 2016

(65) Prior Publication Data

US 2017/0024202 A1  Jan. 26, 2017

(30) Foreign Application Priority Data

Jul. 21, 2015  (JP) ................................. 2015-143810

(51) Int. Cl.
  *G06F 8/65*  (2018.01)
  *G06F 9/4401*  (2018.01)

(52) U.S. Cl.
  CPC .............. *G06F 8/65* (2013.01); *G06F 9/4411* (2013.01)

(58) Field of Classification Search
  CPC ........................................................ G06F 8/65
  USPC ................................................. 717/171, 168
  See application file for complete search history.

(56) References Cited

U.S. PATENT DOCUMENTS

| | | | | |
|---|---|---|---|---|
| 2004/0255291 A1* | 12/2004 | Sierer | ....................... | G06F 8/61 |
| | | | | 717/174 |
| 2011/0214021 A1* | 9/2011 | Vidal | ....................... | G06F 8/65 |
| | | | | 714/38.1 |
| 2013/0067449 A1* | 3/2013 | Sannidhanam | ........... | G06F 8/60 |
| | | | | 717/170 |
| 2014/0250432 A1* | 9/2014 | Zuverink | .................. | G06F 8/65 |
| | | | | 717/173 |
| 2014/0373000 A1* | 12/2014 | Kanematsu | ............. | G06F 8/665 |
| | | | | 717/170 |
| 2014/0373001 A1* | 12/2014 | Wang | ........................ | G06F 8/65 |
| | | | | 717/170 |

(Continued)

FOREIGN PATENT DOCUMENTS

JP    2014-160318 A    9/2014

OTHER PUBLICATIONS

"Software Versioning"; Wikipedia.org website; Jul. 11, 2015.*

(Continued)

*Primary Examiner* — Qing Chen
*Assistant Examiner* — Clint Thatcher
(74) *Attorney, Agent, or Firm* — Cowan, Liebowitz & Latman, P.C.

(57) ABSTRACT

An information processing apparatus includes an operating system on which a plurality of device drivers with different structures are installable, and is configured to: update a device driver that has been installed with a device driver to be updated when identifiers of the device driver that has been installed and the device driver to be updated are different; install the device driver to be updated when the identifiers of the drivers are identical and pieces of model information of the drivers are different; and display a message for inquiring a user of whether or not to update the device driver that has been installed with the device driver to be updated when the identifiers of the drivers are identical and the pieces of model information of the drivers are identical.

13 Claims, 18 Drawing Sheets

(56) References Cited

U.S. PATENT DOCUMENTS

2016/0162286 A1* 6/2016 Bankole .................... G06F 8/71
717/170
2017/0155514 A1* 6/2017 Schulz .................. H04L 9/3247

OTHER PUBLICATIONS

"Update and Manage Printer Drivers"; Microsoft TechNet website (technet.microsoft.com); May 12, 2009.*
"File Properties Dialog Box"; InstallShield.com website (Full URL in reference); May 2014 (Year: 2014).*

* cited by examiner

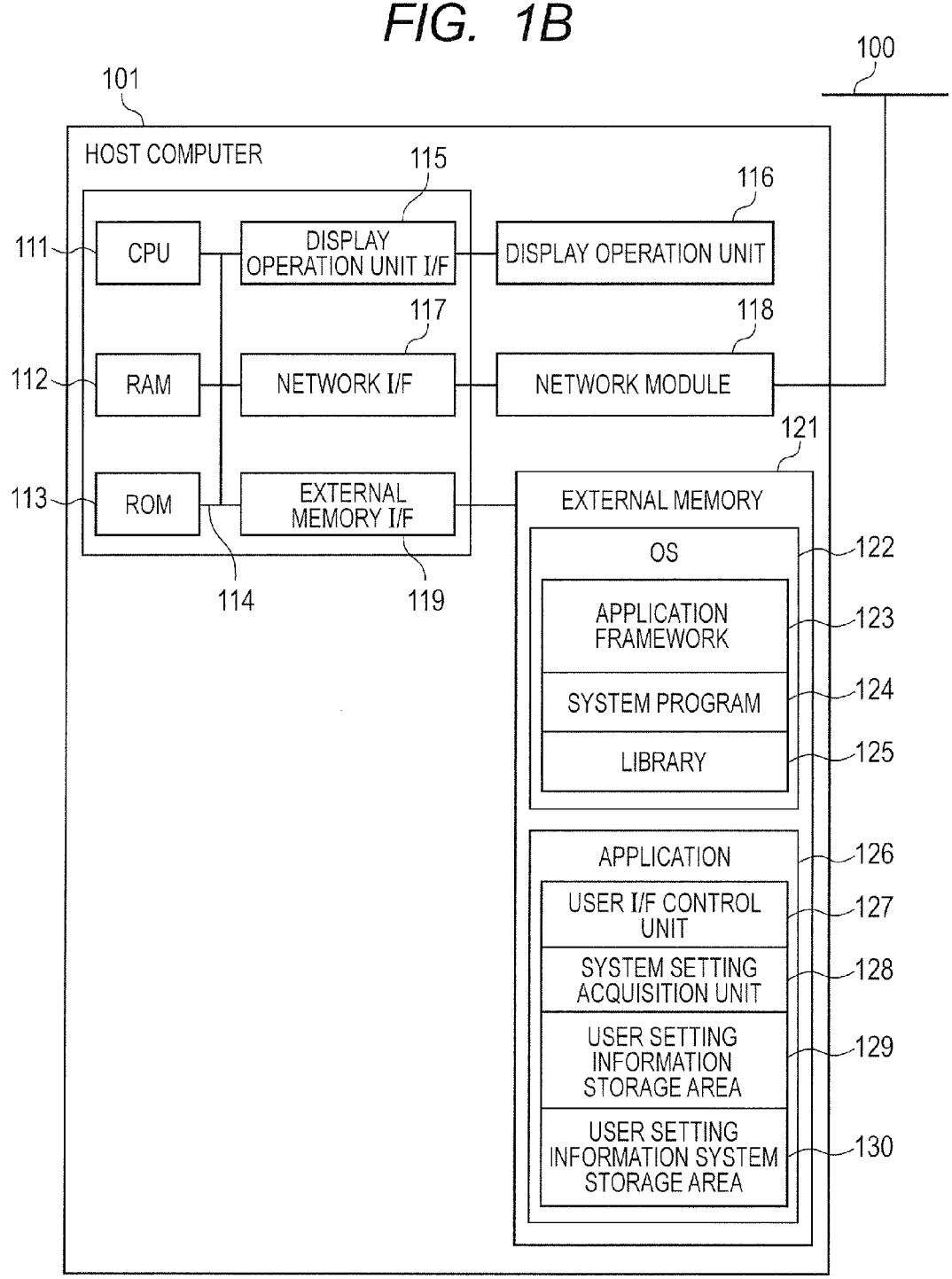

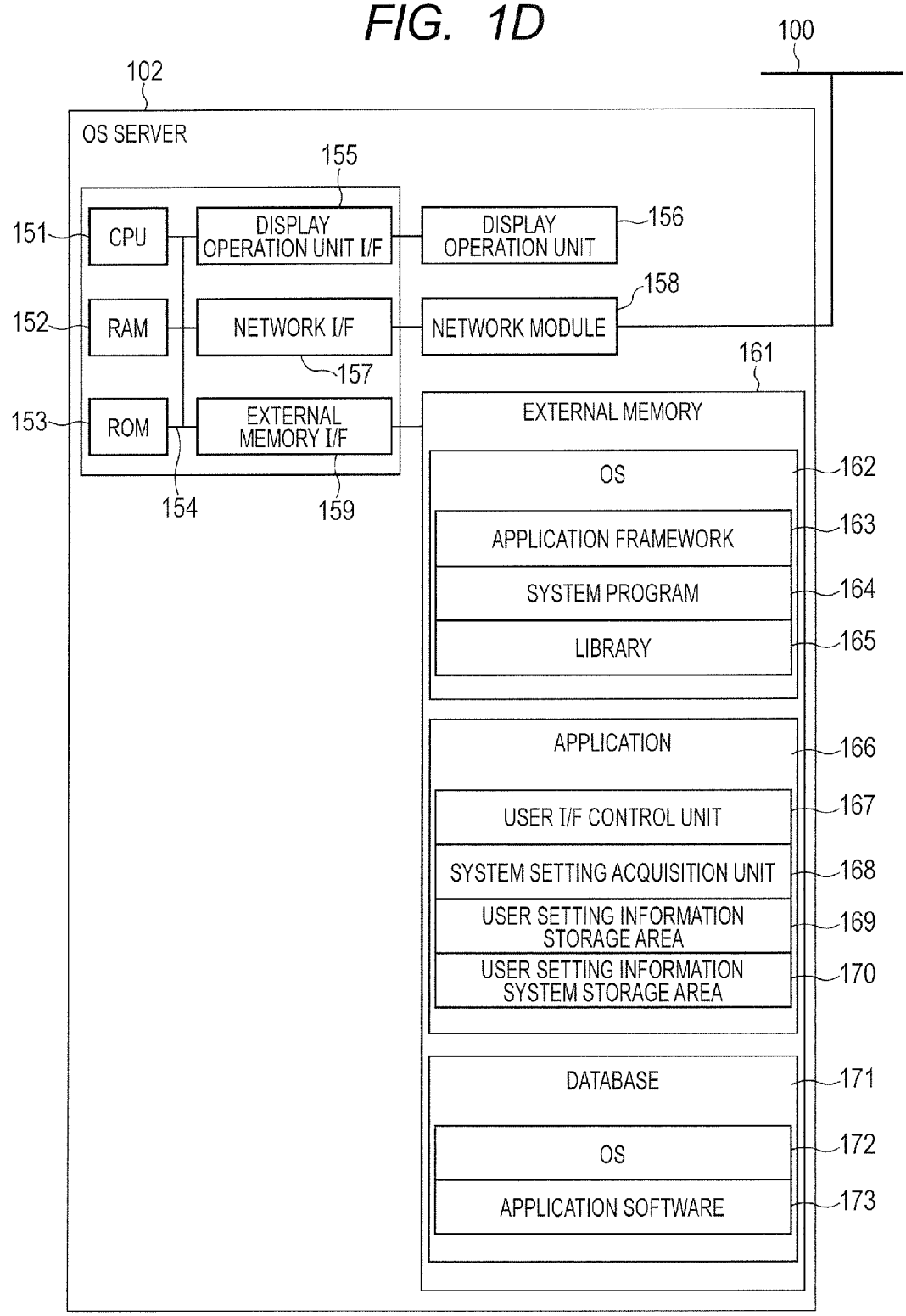

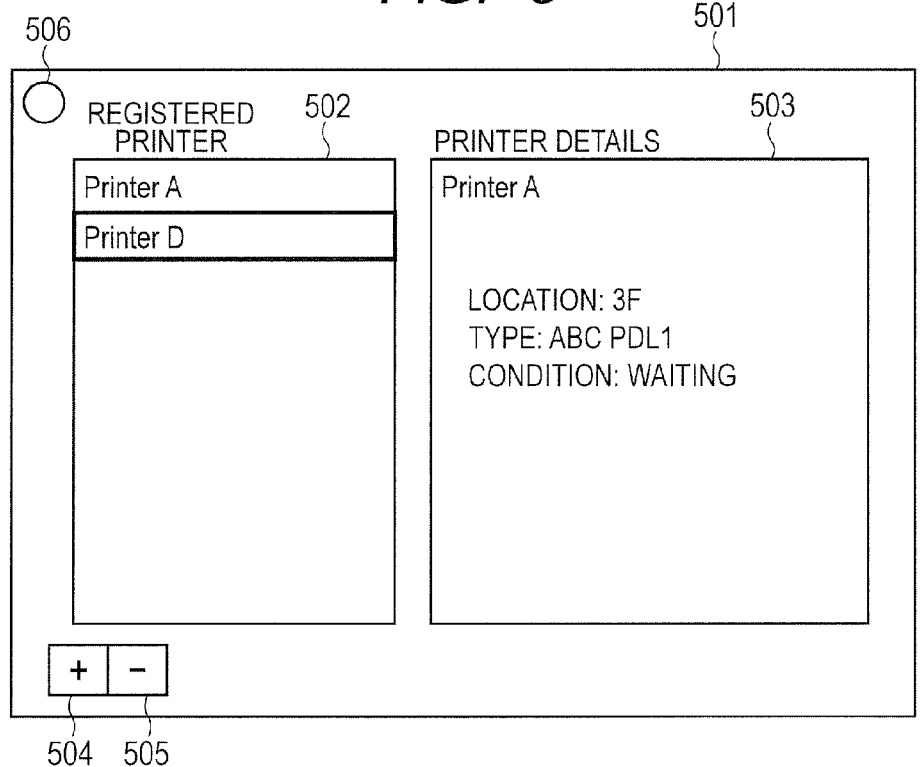

FIG. 8

801: <Printer PrinterC_192.168.1.10_>
802:   Info PrinterC
803:   Location 2F
804:   DeviceURI lpd://192.168.1.10
805:   DriverName ABC PDL1
806: </Printer>

FIG. 9

901: *% Printer Description for Printer C
902: *Manufacuturer: "ABC"
903: *Product: "Printer C"
904: *PrinterLanguage: ABC PDF1
905: *DriverVersion: "PDL1 1.00"

906: *OpenUI *PageSize: PickOne
907: *DefaultPageSize: A4
908: *PageSize A3
909: *PageSize A4
       ......
910: *CloseUI *PageSize 911: *OpenUI *Duplex: PickOne
912: *DefaultDuplex: None
913: *Duplex None
914: *Duplex Simplex
915: *Duplex Duplex
916: *CloseUI *Duplex

FIG. 10

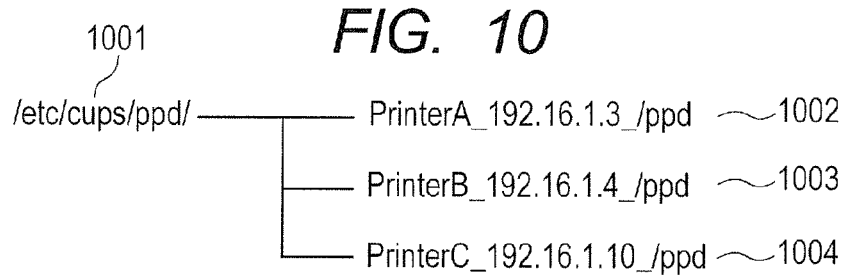

FIG. 12A

| No | SOFTWARE NAME | VERSION |
|---|---|---|
| 1 | WORD PROCESSOR | 12.x.y.zzz |
| 2 | SPREADSHEET | 12.s.t.uuu |
| 3 | PRESENTATION | 12.a.b.ccc |
| 4 | DTP | 3.11 |
| 5 | BROWSER, COMPANY M | 13.1 |
| 6 | PRINTER DRIVER, COMPANY A | 21.30 |
| 7 | PRINTER DRIVER, COMPANY B | 7.ab |
| 8 | PRINTER DRIVER, COMPANY C | 11.cd |
| 9 | MOUSE DRIVER, COMPANY D | 2.01 |
| 10 | SECURITY 1234 | — |
| 11 | SECURITY 1357 | — |

1201     1202     1203

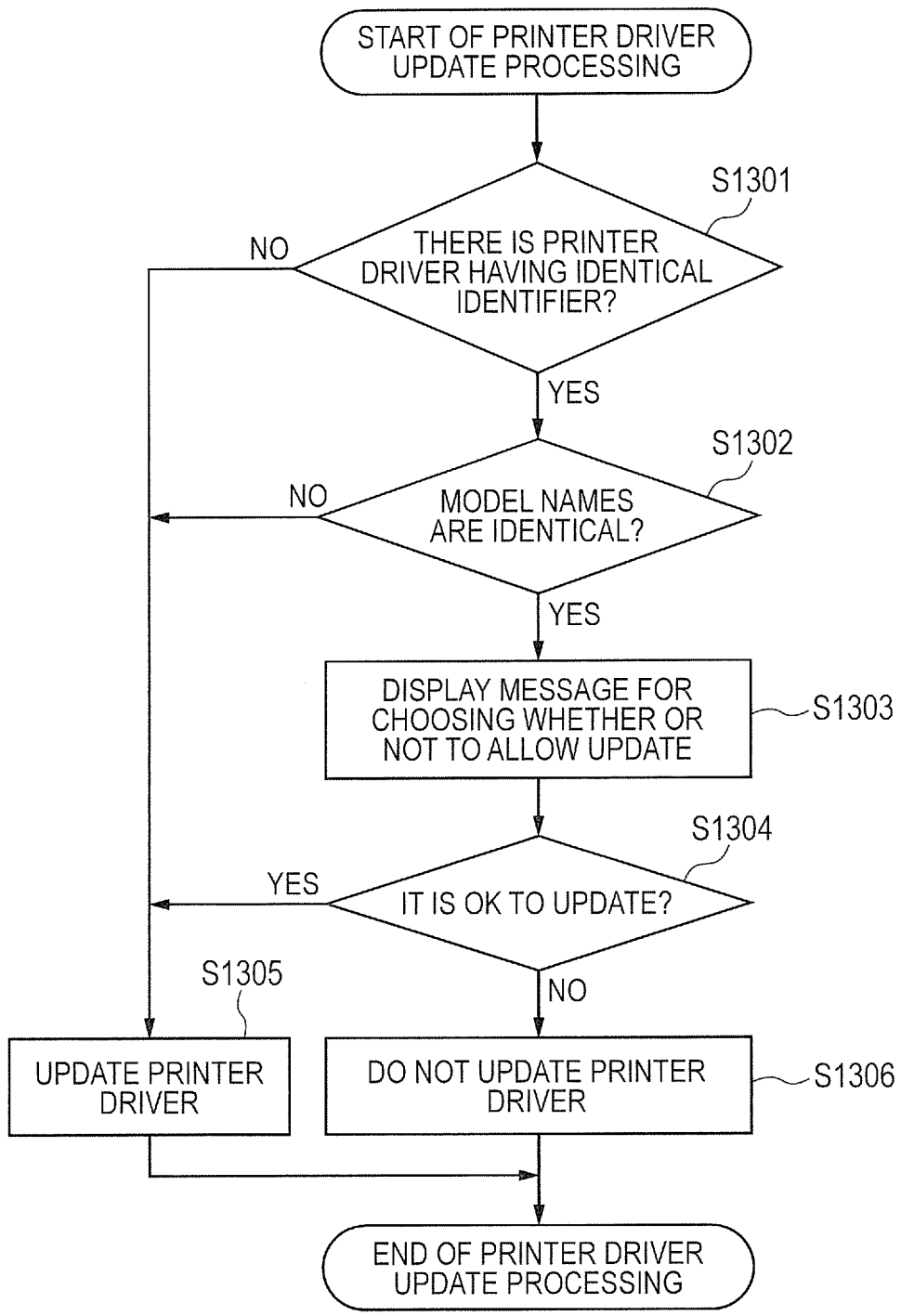

| OS | Ver N-1 | Ver N | Ver N+1 |
|---|---|---|---|
| SOFTWARE ARCHITECTURE | ONLY SIXTH GENERATION | SIXTH GENERATION AND SEVENTH GENERATION | ONLY SEVENTH GENERATION |

PRINTER AND FAX

Canon Printer Driver Gen6 A —1411
Canon Printer Driver B
Canon Printer Driver D
Canon Printer Driver Gen7 A —1412

| REGISTRATION INFORMATION | VALUE | |
|---|---|---|
| SELECTED PRINTER | Canon Printer Driver Gen6 A | —1422 |
| DRIVER TO BE USED | Canon Printer Driver Gen6 Ver. 10.0 | |
| PORT TO BE USED | 192.xxx.yyy.zzz | |
| PRINTER NAME | Canon Printer Driver Gen6 A-1 | |
| GENERATION NUMBER | 6 | —1423 |
| IDENTIFIER | 1234 | —1421 |

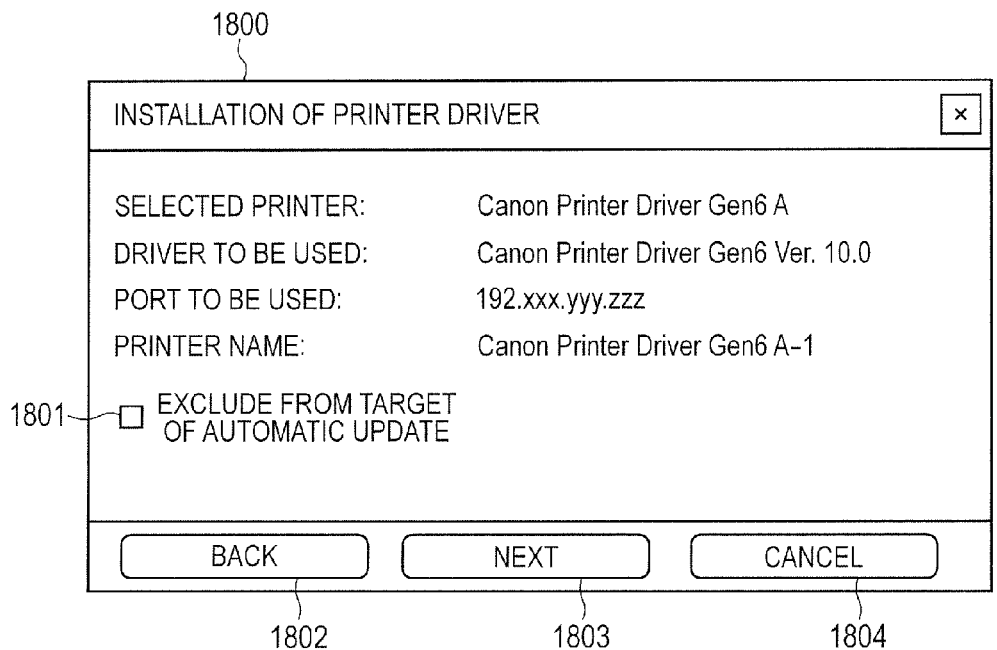

INFORMATION PROCESSING APPARATUS, METHOD, AND PROGRAM

BACKGROUND OF THE INVENTION

Field of the Invention

The present invention relates to an operating system to be installed on a host computer to control an operation of the host computer, and also to update processing for various types of application software installed on a host computer.

Description of the Related Art

Hitherto, consideration is taken to an operating system (OS) installed on a host computer or the like to control an operation of the host computer so that the OS is always updated to the latest version. In this case, the host computer accesses a server (OS server) on a network, which is configured to provide the latest version of the OS, and when the latest version of the OS provided, processing to update the OS is performed. The OS server may include software, e.g., various types of applications to be installed on the host computer. Some pieces of software to be updated may have their base portion (hereinafter referred to as "generation"), e.g., a configuration or architecture of an old version of software changed greatly in some cases.

For example, there has hitherto been provided a system in which a printer driver is automatically installed when a host computer and a printing apparatus are connected by a cable, e.g., a USB cable. Further, a plurality of printer drivers that are greatly different from each other (different in base, e.g., architecture) are provided. In Japanese Patent Application Laid-Open No. 2014-160318, there is provided a configuration for allowing a user to choose which of the printer drivers is to be installed in such a case.

As described above, there has hitherto been provided a system for automatically executing update processing based on update information for software or the like. However, there is a problem in that a user does not always desire all pieces software to be updated automatically. A reason for this that can be given is, for example, that the user is accustomed to using an old version of software, or that software is strictly managed by the user's company and an installation test is conducted at the time of installation. In order to solve this problem, there have been proposed solutions including displaying, at the time of update, a message for confirming with a user as to whether or not to allow the update. However, some types of software can be installed while allowing pieces of different versions of software or pieces of software having different architectures to coexist. In such a case, there are prepared a method of updating an old version of software with a new one and a method of installing software while allowing a plurality of pieces of software, i.e., old and new versions or software, to coexist, and it is also possible to use one of those methods properly depending on an intended use. Therefore, there is a problem in that update processing of merely updating a lower version of software with a higher version thereof is insufficient in some cases.

SUMMARY OF THE INVENTION

In order to solve the above-mentioned problem, one embodiment of the present invention provides an information processing apparatus including an operating system on which a plurality of device drivers having different structures are installable, and further including the following units. That is, the information processing apparatus includes: a first comparison unit configured to compare an identifier for identifying uniqueness of a device driver that has been installed on the information processing apparatus and a corresponding identifier of a device driver to be updated; a second comparison unit configured to compare a piece of model information indicating a model of the device driver that has been installed and a corresponding piece of model information of the device driver to be updated; and a control unit configured to control update of the device driver based on the comparison by the first comparison unit and the comparison by the second comparison unit. The control unit is configured to: update the device driver that has been installed with the device driver to be updated when it is determined based on the comparison by the first comparison unit that the two identifiers are different; install the device driver to be updated when it is determined based on the comparison by the first comparison unit that the two identifiers are identical, and when it is determined based on the comparison by the second comparison unit that the two pieces of model information are different; and display a message for inquiring a user of whether or not to update the device driver that has been installed with the device driver to be updated when it is determined based on the comparison by the first comparison unit that the two identifiers are identical, and when it is determined based on the comparison by the second comparison unit that the two pieces of model information are identical.

According to the present invention, driver software can be installed flexibly. As a result, usability of a user is enhanced.

Further features of the present invention will become apparent from the following description of exemplary embodiments with reference to the attached drawings.

BRIEF DESCRIPTION OF THE DRAWINGS

FIG. 1B is a block diagram for illustrating a host computer.

FIG. 1D is a block diagram for illustrating an OS server.

FIG. 5 is a diagram for illustrating a user I/F for registering a print queue.

FIG. 6 is a diagram for illustrating a user I/F for adding a print queue.

FIG. 8 is an illustration of a registered queue file.

FIG. 9 is an illustration of a printer specification description file.

FIG. 10 is an illustration of a storage location of the printer specification description file and a file stored in the storage location.

FIG. 12A is a table for showing an example of a list of pieces of software to be updated.

FIG. 13 is a flowchart for illustrating printer driver update processing.

FIG. 14A is a table for showing an example of a relationship between an OS and software generations.

FIG. 14B is a diagram for illustrating an example of display of a printer driver.

FIG. 14C is a table for showing an example of printer driver registration information.

FIG. 18A is a diagram for illustrating an example of display of an installer according to the present invention.

FIG. 18B is a table for showing an example of printer driver registration information according to the present invention.

DESCRIPTION OF THE EMBODIMENTS

Now, referring to the accompanying drawings, an embodiment of the present invention is described. In the following description, the operating system is abbreviated as "OS", and steps in flowcharts are represented by "S".

[System Configuration]

Figure 1A:
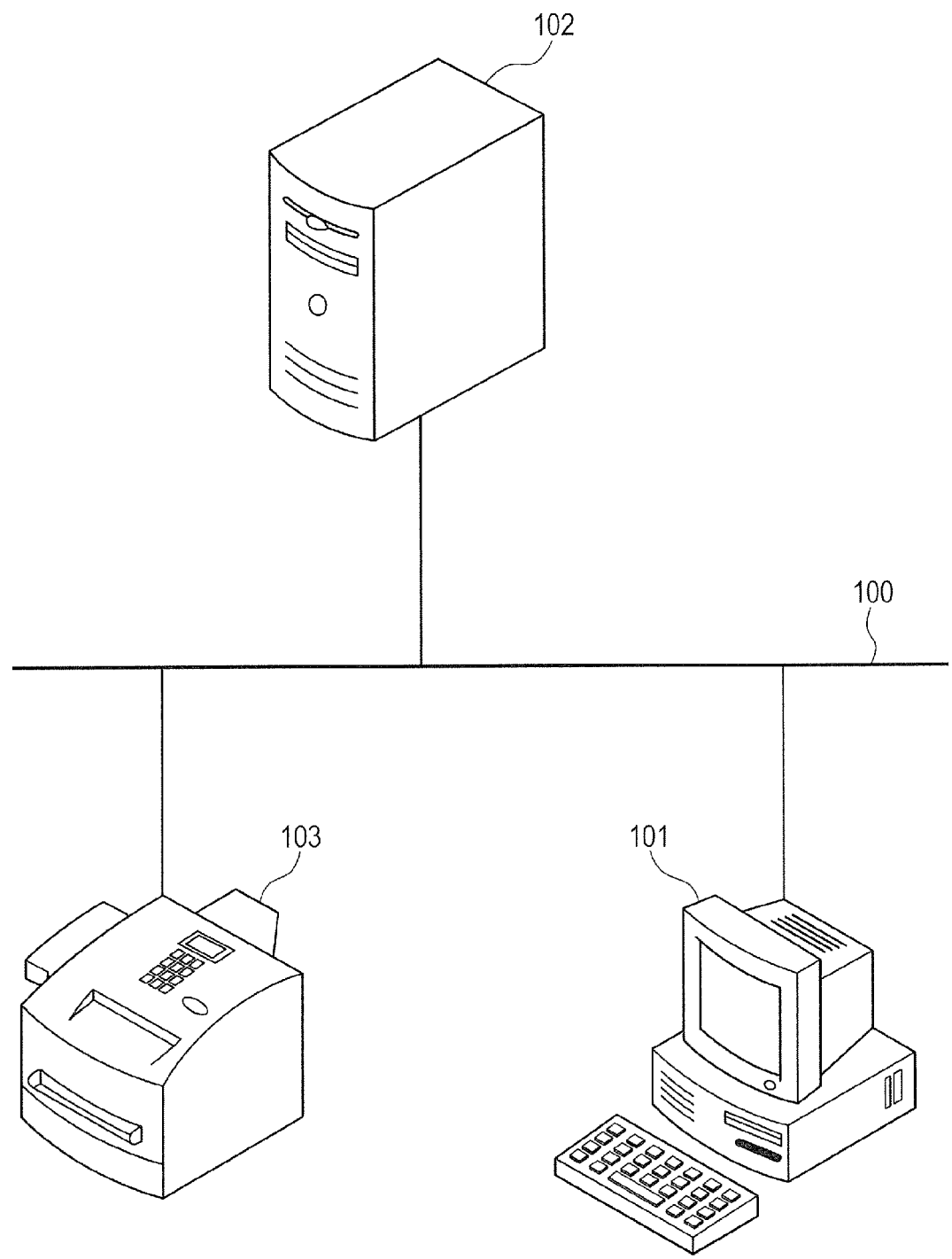
FIG. 1A is an overall diagram for illustrating a system.

FIG. 1A is an overall diagram of a system according to the embodiment of the present invention. This system includes an information processing apparatus 101 (hereinafter referred to as "host computer"), an operating system server 102 (hereinafter referred to as "OS server"), and an image forming apparatus 103, which are each connected to a network 100. Further, installation of the OS on the host computer 101 is implemented by a CPU executing a program supplied from an external medium, e.g., a CD-ROM, or the OS server 102 and loaded onto a RAM. The OS server 102 is a server on the network, which is configured to provide the latest version of the OS. The image forming apparatus 103 is a printing apparatus (printer) only having a printing function, or a multifunction peripheral (MFP) having a scanner function and a FAX function as well as the printing function.

FIG. 1B is a block diagram for illustrating an apparatus internal configuration of the host computer 101. In the host computer 101, a CPU 111 (control unit) is configured to generally control each device connected to a system bus 114 in accordance with a program stored in a RAM 112. This RAM 112 also functions as a main memory, a working area, and the like of the CPU 111. A ROM 113 is configured to store various types of basic programs and data of the system. A display operation unit I/F 115 is configured to control display of information on a display operation unit 116. Further, the display operation unit 116 has a display function, and at the same time, controls input from a user through a touch panel. A network I/F 117 is configured to control a network module 118 to implement network communication. An external memory I/F 119 is configured to control access to/from an external memory 121 (e.g., flash memory or solid state disk). The external memory 121 is configured to store an OS 122 and various types of applications 126, and to function as a storage medium into which the host computer 101 can save data or from which the host computer 101 can read data.

The OS 122 includes an application framework 123 for operating an application, various types of system programs 124 provided by the OS 122, and a library 125 in which various types of utility functions and others are stored. The application 126 includes an application execution code, and further includes a user I/F control unit 127 and a system setting acquisition unit 128 configured to acquire a value set by the system program 124 of the OS 122. The application 126 still further includes a user setting information storage area 129 for storing user setting information set by the user through the application 126 and a user setting information system storage area 130 for storing various types of settings made by the system program 124.

Figure 1C:
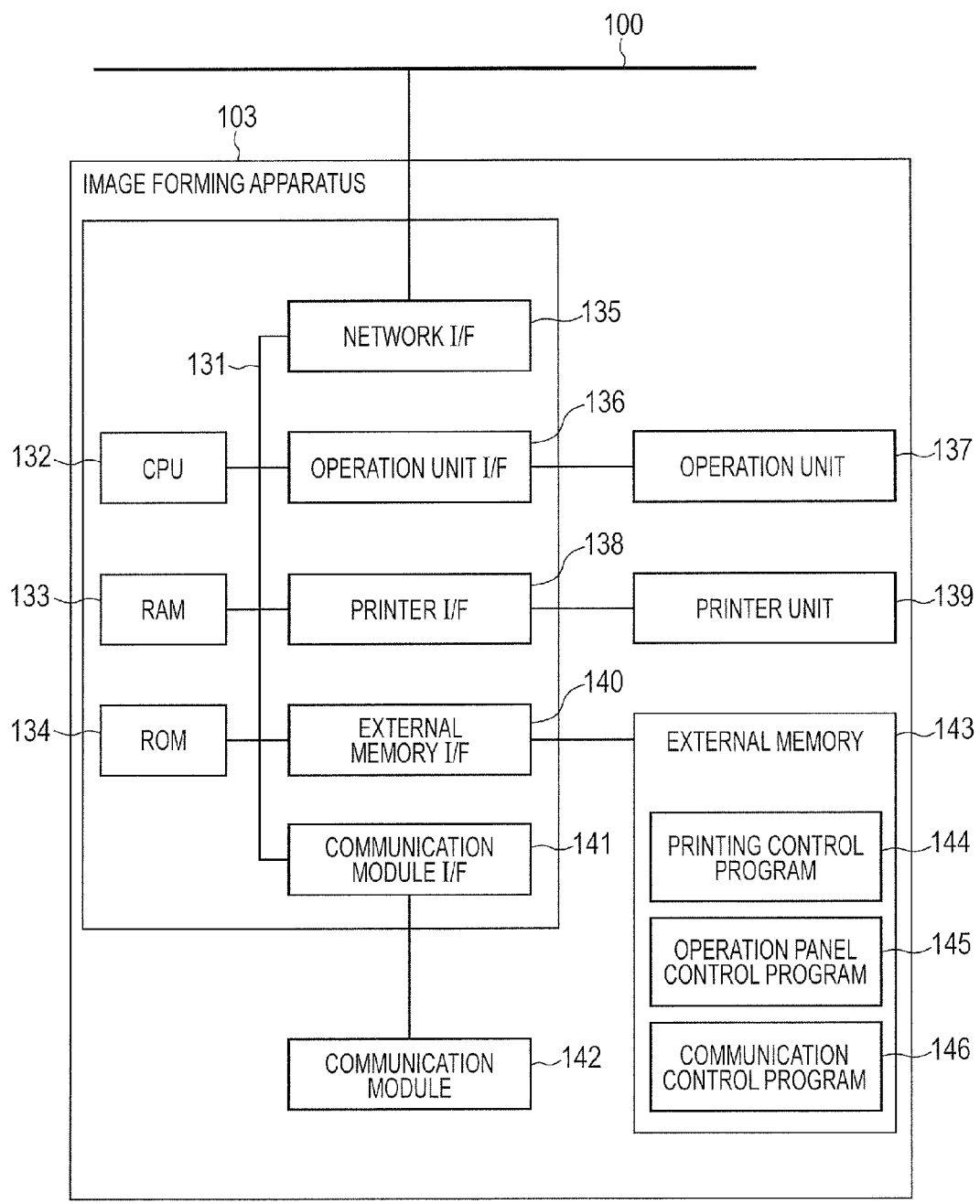
FIG. 1C is a block diagram for illustrating an image forming apparatus.

FIG. 1C is a block diagram for illustrating an apparatus configuration of the image forming apparatus 103. A CPU 132 is configured to control an operation of the entire image forming apparatus 103. A RAM 133 functions as a main memory, a working area, and the like of the CPU 132, and is also used as an image information expansion area and an environmental data storage area. The RAM 133 also has a non-volatile RAM (NVRAM) area, and can increase its memory capacity with an option RAM connected to an expansion port (not shown). A ROM 134 is configured to store various types of fonts, a control program to be executed by the CPU 132, and various types of data.

A network I/F 135 is configured to transmit/receive data to/from the host computer 101 or a client apparatus connected to another network. A printer I/F 138 configured to control an interface with a printer unit 139 serving as a printer engine. A communication module I/F 141 is configured to control a communication module 142 configured to communicate to/from devices on the networks. An external memory I/F 140 is configured to control access to/from an external memory 143 (e.g., flash memory or solid state disk). The external memory 143 includes a printing control program 144 for forming an image, an operation panel control program 145 for controlling screen display on an operation panel, and a communication control program 146 for controlling communication. An operation unit I/F 136 is configured to control an interface with an operation unit 137 for setting printing processing and the like of the image forming apparatus 103. The operation unit 137 is provided with an operation panel for receiving the user's operation. On the operation panel, switches for operation, an LED indicator, a liquid crystal display, and others are provided. The image forming apparatus 103 may further include an NVRAM (not shown) to store printing setting information received from the operation panel.

FIG. 1D is a block diagram for illustrating an apparatus internal configuration of the OS server 102. In the OS server 102, the CPU 151 is configured to generally control each device connected to a system bus 154 in accordance with a program stored in a RAM 152. This RAM 152 also functions as a main memory, a working area, and the like of the CPU 151. A ROM 153 is configured to store various types of basic programs and data of the system. A display operation unit I/F 155 is configured to control display of information on a display operation unit 156. Further, the display operation unit 156 has a display function, and at the same time, controls input from the user through a touch panel structure. A network I/F 157 is configured to control a network module 158 to implement network communication. An external memory I/F 159 is configured to control access to/from an external memory 161 (e.g., flash memory or solid state disk). The external memory 161 is configured to store an OS 162 and various types of applications 166, and to function as a storage medium into which the host computer 101 can save data or from which the host computer 101 can read data.

The OS 162 includes an application framework 163 for operating an application, various types of system programs 164 provided by the OS 162, a library 165 in which various types of utility functions and others are stored. The application 166 includes an application execution code, and further includes a user I/F control unit 167 and a system setting acquisition unit 168 configured to acquire a value set by the system program 164 of the OS 162. The application 166 still further includes a user setting information storage area 169 for storing user setting information set by the user through the application 166 and a user setting information system storage area 170 for storing various types of settings made by the system program 164.

The external memory 161 further includes a database 171 configured to store an OS 172, various types of application software 173, and others. In the OS server 102, when an inquiry about update information is received from each host computer 101, one of the applications 166 compares update information of the OS 172 or the various types of application software 173 stored in the database 171. Then, as necessary, the OS server 102 transmits a software group stored in the database 171 (any one of the OS 172 and the application software 173, or both thereof) to the host computer 101 from which the inquiry is received, via the network module 158.

[Printer Driver Installation and Print Queue Registration]

Now, an operation of the system is described taking a printer driver as an example of a device driver to be updated among a plurality of types of device drivers. First, installation of the printer driver is described.

Figure 2:
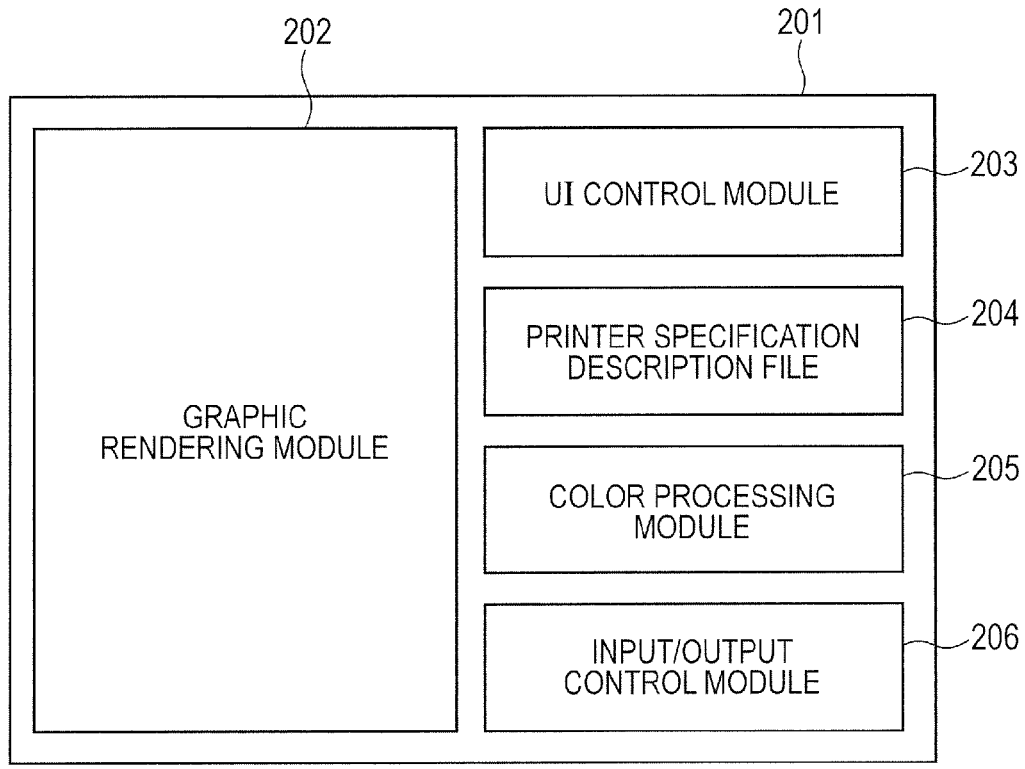
FIG. 2 is a diagram for illustrating a module configuration of a printer driver.

FIG. 2 is a diagram for illustrating a group of modules of the printer driver, which are prepared when the printer driver is installed. The printer driver 201 includes a graphic rendering module 202, a UI control module 203, a printer specification description file 204, a color processing module 205, and an input/output control module 206. The printer driver may include modules other than those modules depending on its function.

There are several methods of creating a printer driver. One example of the methods is to, in order to support a plurality of printers with one printer driver, create the graphic rendering module 202 and the UI control module 203 so that a plurality of printers can be supported, and package, in one printer driver, as many printer specification description files 204 as the number of printers supported by the printer driver. In such a method, the UI control module 203 is configured to display and control a UI in accordance with the printer specification description file 204. Further, the graphic rendering module 202 is configured to issue a page description language and a printer control command suited to each printer.

Figure 3:
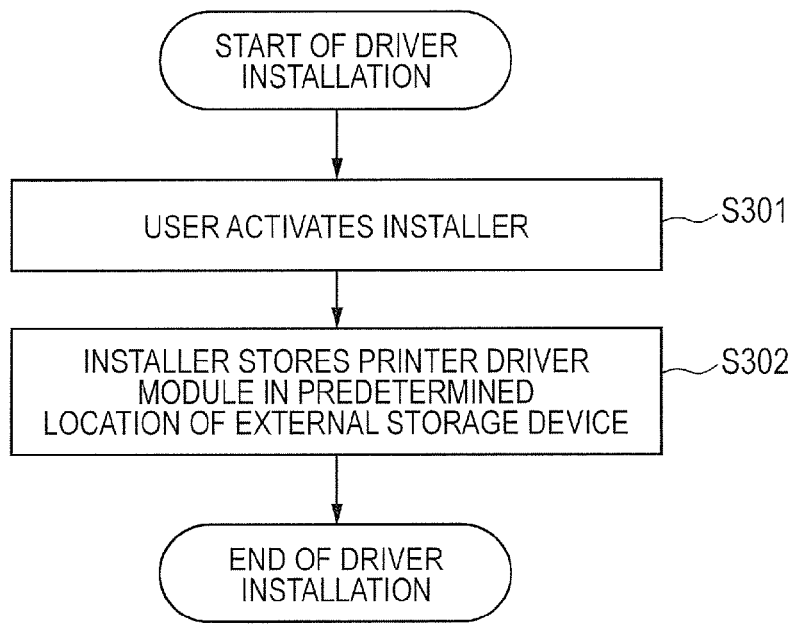
FIG. 3 is a flowchart for illustrating a method of installing a printer driver.

Next, referring to FIG. 3, a procedure for installing the printer driver having such a configuration on the host computer 101 is described. It is assumed that the user has prepared a CD-ROM in which the printer driver is stored, or the user has acquired a printer driver installer via a network.

In S301, the user activates the acquired printer driver installer. With this operation serving as a trigger, in S302, the installer stores a printer driver module in a predetermined location of the external memory 121. The location where the printer driver module is to be stored differs depending on the printing system. As one example, in a Common Unix Printing System (CUPS), a printer driver module for each vendor is stored under a directory "/Library/Printers/". Further, under the directory for each vendor, the printer driver can be stored for each type of printer driver. For example, when there are different printer drivers "PDL1" and "PDL2" of a vendor "ABC", directories "/Library/Printers/ABC/PDL1/" and "/Library/Printers/ABC/PDL2/" are created for the respective printer drivers. Then, the respective printer drivers can be stored under those directories. In this manner, in S302, the installer stores the printer driver module in the above-mentioned directory of the external memory 121. The installation of the printer driver is thus completed, but in order to actually output data to the printer, the user needs to register the printer through use of the printer driver. A procedure for the registration is described below.

Figure 4:
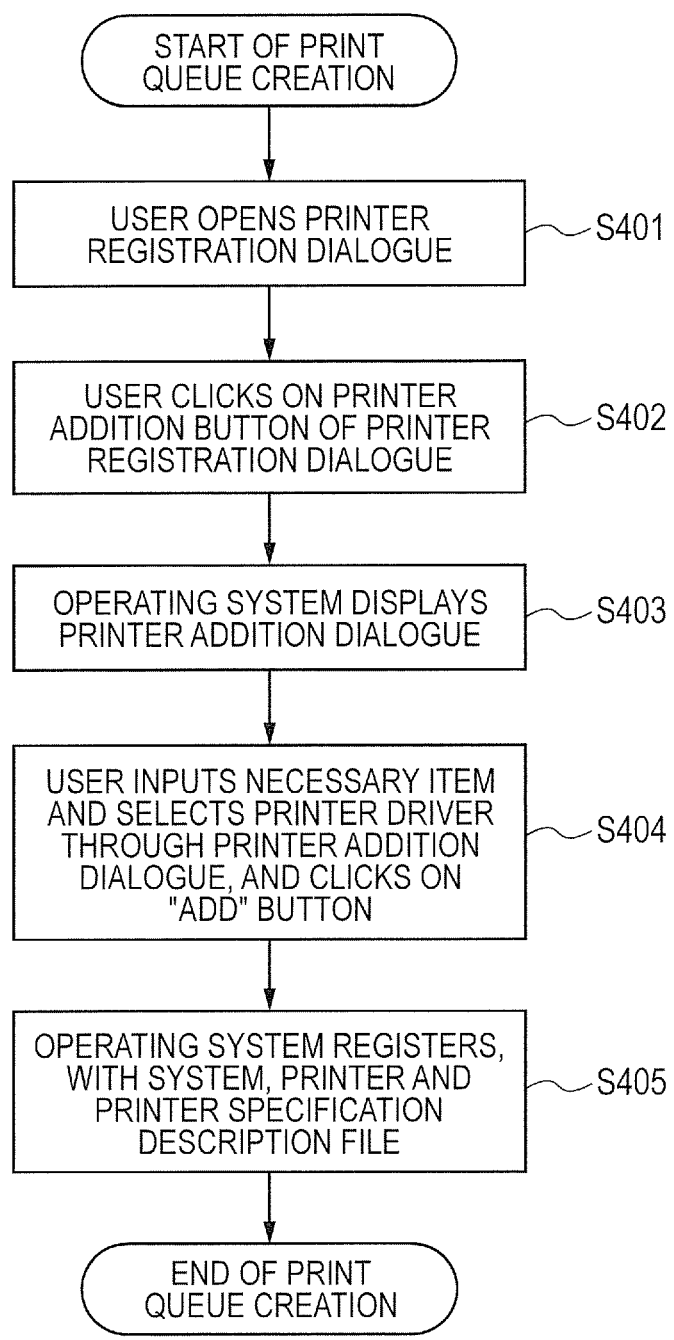
FIG. 4 is a flowchart for illustrating a method of registering a print queue.

FIG. 4 is a flowchart for illustrating a procedure for registering a print queue. First, in S401, the user opens a dialogue for registering a print queue. In this step, the OS 122 reads a program code for registering a printer from the external memory 121 into the RAM 112 and executes the read program code.

FIG. 5 is a diagram for illustrating a printer registration dialogue 501 to be displayed by the OS 122. The printer registration dialogue 501 includes a currently registered print queue list 502 for displaying a list of printers that are currently registered and a printer details display area 503 for displaying detailed information of a printer that is selected in the list. The printer registration dialogue 501 further includes a button 504 for registering a print queue, a button 505 for deleting a printer that is selected in the currently registered print queue list 502, and a button 506 for closing this dialogue.

Next, in S402, the user clicks on the print queue addition button 504 of the printer registration dialogue 501. In response to this user operation, in S403, the OS 122 displays a dialogue for additionally registering a printer. To the dialogue displayed in this step, in S404, the user inputs necessary information to add a printer.

FIG. 6 is a diagram for illustrating a print queue addition dialogue 601 to be displayed by the OS 122. In the print queue addition dialogue 601, a network address of a connected printer (IP address in this example) is specified through a control 602, and the name of the printer for identifying the print queue is input through a control 603. Further, a location where the printer is installed is input through a control 604. The name (603) and location (604) of the printer are character strings to be used when the name and location are displayed in the currently registered print queue list 502 and the printer details display area 503. A printer driver to be used for registering the print queue is specified through a control 605. The printer drivers to be listed in this case are stored in the printer driver storage directory (/Library/Printers) of the OS 122 described above, and are listed by the OS 122. In the example of FIG. 6, a state is illustrated in which the address is "192.168.1.10", the name of the print queue is "Printer C", the location is "2F", and "ABC PDL1" is selected as the printer driver. When an "add" button 606 is clicked on in this state, the OS 122 adds a print queue. In order to close the dialogue without adding a print queue, a "cancel" button 607 is clicked on.

Next, in S405, the OS 122 registers the print queue specified by the user with the system. Processing of this step is described in detail with reference to FIG. 7 to FIG. 10.

Figure 7:
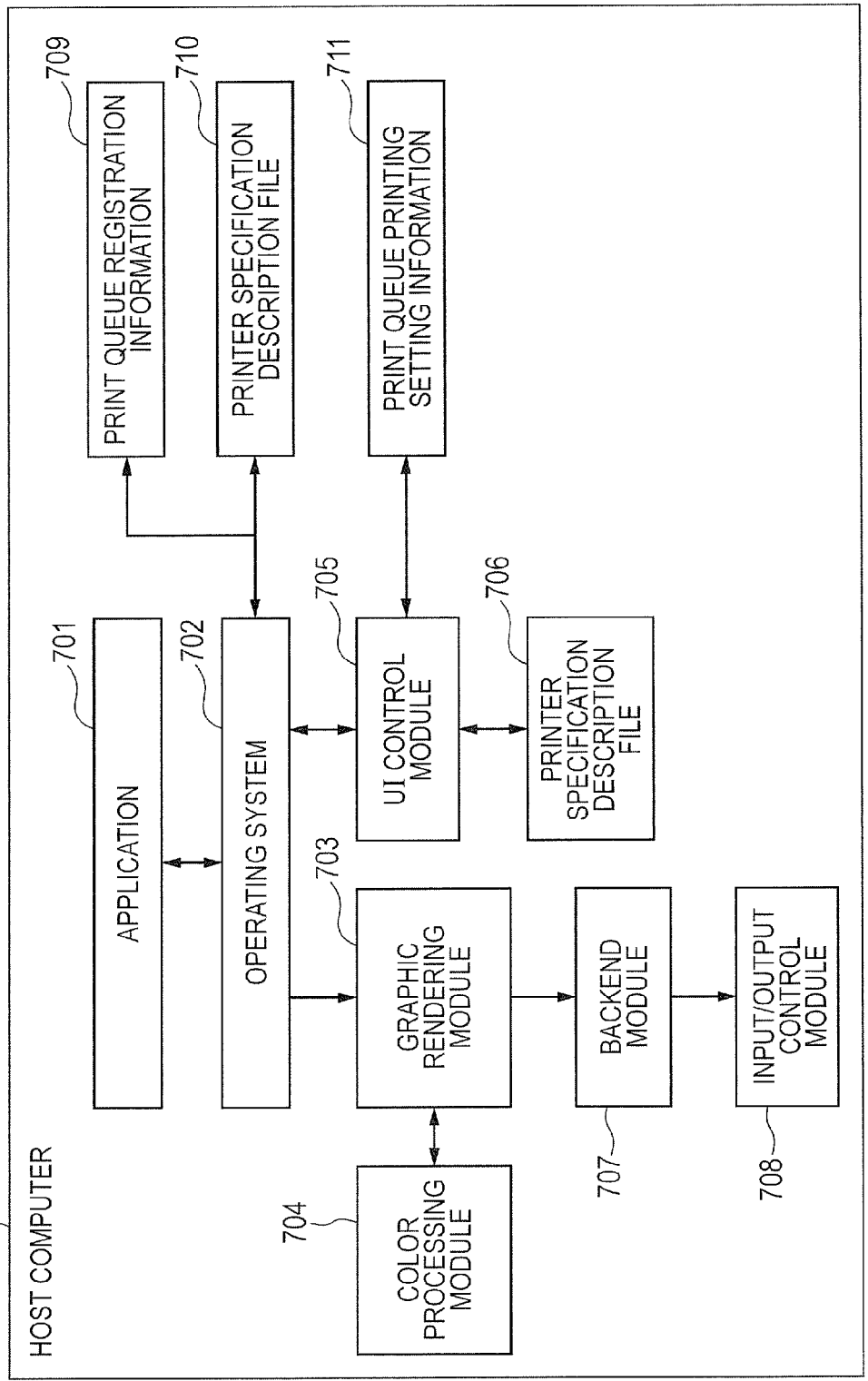
FIG. 7 is a diagram for illustrating a system configuration of a printer driver.

FIG. 7 is a system block diagram for illustrating a state in which a printer driver has already been installed and a print queue has been registered. In FIG. 7, a graphic rendering module 703 is the graphic rendering module 202 of the printer driver that has been installed by the procedure described above on a predetermined directory (/Library/Printers/) of the OS 122. Similarly, a UI control module 705 is the UI control module 203 of the installed printer driver. A color processing module 704 is the color processing module 205 of the installed printer driver. An input/output control module 708 is the input/output control module 206 of the installed printer driver. Further, a printer specification description file 706 is the printer specification description file 204 of the installed printer driver. A backend module 707 is a module provided by the OS 122 and is configured to transfer printing data generated by the graphic rendering module 703 to the input/output control module 708 configured to transmit the data to the printer. Further, a print queue registration information 709, a printer specification description file 710, and a printer setting file 711 are generated by the OS 122 in the process of the printer registration of FIG. 4, and are described in detail below.

In S405, the OS 702 collects information of the printer addition dialogue to perform work of registering a printer. This registration is performed in the following manner.

FIG. 8 is an illustration of a file (markup language) in which information of a print queue to be registered in described. In this file, an identifier 801 of the print queue describes the name of a printer, followed by an underscore and an address of the printer, an identifier 802 describes the name of the printer, and an identifier 803 describes a location of the printer. An identifier 804 describes an actual print queue, and in this example, data is transmitted to the address "192.168.1.10" in accordance with the Label Distribution Protocol (LDP). An identifier 805 describes the name of a printer driver to be used by the printer ("ABC PDL1" in this case), and an identifier 806 describes the description of this printer is finished. The OS 702 of FIG. 7 creates this description in S405, and additionally writes this printer registration information into a predetermined file of the external memory 121. The predetermined file is, in the CUPS, for example, a "printers.conf" file stored in an "/etc/cups/" directory. This information is the print queue registration information 709. When a plurality of print queues are registered, in the "printers.conf" file, as many descriptions of FIG. 8 as the number of print queues are repeated for respective corresponding printers.

In the manner described above, in S405, the OS 702 registers the printer specification description file 706 with the system. In FIG. 7, the OS 702 acquires from the UI control module 705 of the printer driver the printer specification description file 706 of the printer to be registered, and registers this file with a predetermined location of the system that is prepared for each print queue (printer specification description file 710).

Before a method registering the printer specification description file 706 is described, the file itself is described. FIG. 9 is an illustration of an example of the printer specification description file 706. This file is described in accordance with a printer specification description format. The printer specification description file 706 is described below in consideration of the format as well.

In the file of FIG. 9, an identifier 901 describes a comment (the head of the line is "*%"), an identifier 902 describes a vendor name, and an identifier 903 describes the name of a printer supported by the printer specification description file 706. Further, an identifier 904 describes a page description language supported by the printer specification description file 706, and an identifier 905 describes a version of the printer driver. The subsequent lines describe functional specifications of the printer. As the functional specifications, one function is described from a line starting with "*OpenUI" to a line starting with "*CloseUI". "*OpenUI" is followed by a function name having "*" added to its head. The function name is followed by ":", further followed by a type at the time of selection of the function. The type includes "PickOne" and "Boolean". "PickOne" indicates that the relevant function selects one option from a plurality of options, and "Boolean" indicates that the relevant function is controlled based on on/off.

An identifier 906 indicates that there is a function "*PageSize", and this function selects one option from a plurality of options. The subsequent line of the identifier 906 describes a default value of this function. This line starts with "*Default", followed by the function name defined in the previous line. This line indicates that the default value of the function "PageSize" is "A4". From the subsequent line to an identifier 910 starting with "*CloseUI", one of the options of this function is described in each line. For example, an identifier 908 indicates that one of the options of the function "PageSize" is "A3". This block describes a function of selecting a page size, and the page size includes a large number of options, and hence options in the middle are omitted. The last description of this function is an identifier 910, which starts with "*CloseUI", followed by the function name described in the line starting with "*OpenUI". One function is thus described. A block of subsequent identifiers 911 to 916 is a description of another function. While an overlapping description is omitted, this block includes a function. "Duplex", and indicates that this function selects any one of a plurality of options and the options for selection include "None", "Simplex", and "Duplex". The function "Duplex" actually represents a function of designating two-sided printing, and "None" conforms to a default setting of the printer because "None" is not designated. Further, "Simplex" and "Duplex" respectively mean one-sided printing and two-sided printing.

Next, the method of registering the printer specification description file 706 by the OS 702 of FIG. 7 is described. The OS 702 acquires the printer specification description file 706 corresponding to the printer from the UI control module 705, and stores the file in a predetermined location of the system. FIG. 10 is an illustration of a storage location and a file stored in the storage location. The storage location is a directory "/etc/cups/ppd/" of the external memory 121 (1001), and a file to be stored is a file having a file name "(printer name)+(underscore)+(printer address)" (1002, 1003, 1004). The printer specification description file 710 added in this case is "PrinterC_192.168.1.10_.ppd" in the line 1004. This indicates that, in FIG. 7, the OS 702 stores the printer specification description file 706 in the printer specification description file 710.

Through the processing described above, the registration of the print queue is completed.

[Method of Updating Software]

Figure 11:
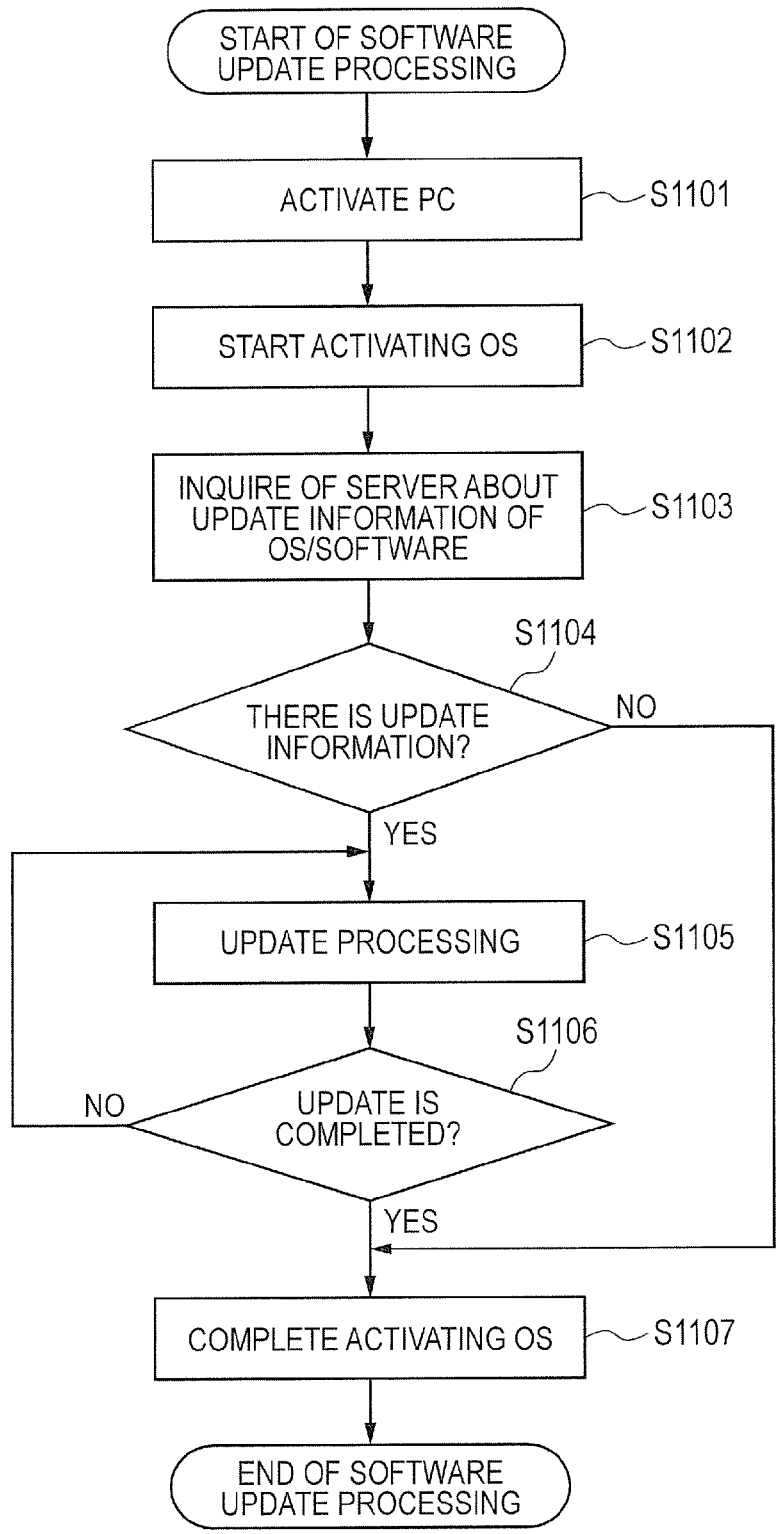
FIG. 11 is a flowchart for illustrating software update processing.
Figure 12B:
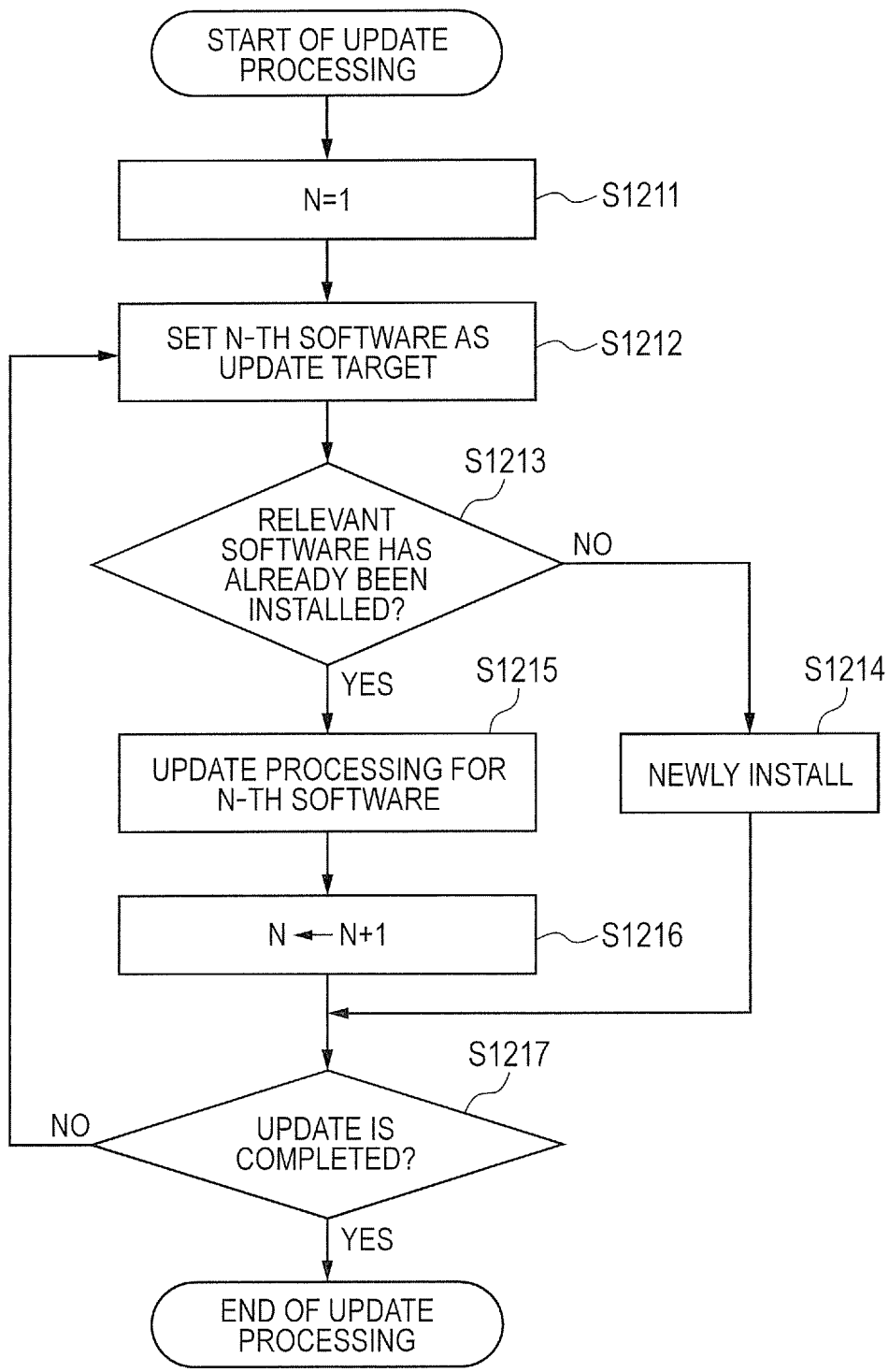
FIG. 12B is a flowchart for illustrating details of the software update processing.

Referring to FIG. 11, FIG. 12A, and FIG. 12B, an example of a method of updating software within the host computer 101 according to the present invention is described.

In the processing of FIG. 11, first, the user performs an activation operation by, for example, turning on the power of the host computer 101 (S1101). With this operation, system BIOS, a boot loader, and the like stored in the ROM 113 or the like are activated in order, to thereby activate the OS 122 (S1102). After the OS 122 is activated, the OS 122 makes an inquiry about update information of the OS 172 or the application software 173 stored in the OS server 102 on the network 100 (S1103). The OS 122 determines whether or not there is update information (S1104), and when there is update information, the OS 122 downloads from the OS server 102 an updated version of the OS 172 or the application software 173 and installs the updated version (S1105). This update processing is repeated as many times as the number of pieces of software to be updated. The OS 122 determines whether or not the update is completed (S1106), and when the update is not completed, the processing returns to S1105. When the update is completed, the activation of the OS is completed (S1107). Further, when it is determined in S1104 that there is no update information, the activation of the OS is completed without the execution of update processing (S1107). A detailed processing flow of the update processing (S1105) is described below with reference to FIG. 12B.

FIG. 12A is a table for showing an example of a list of pieces of software to be updated. In FIG. 12A, a number 1201 assigned for convenience in order to perform update processing in order, and a software name 1202 and a version number 1203 associated with the number 1201 are shown. However, in addition, a file name for installing software and others (not shown) are also included as list information.

In the detailed flow of the update processing of FIG. 12B, first, a processing number N (an initial value thereof is N=1) for determining whether or not the update processing is to be performed for each piece of software is assigned (S1211). The OS 122 determines whether or not a piece of software ("word processor" in this example) having as the number 1201 in the list shown in FIG. 12A has been already installed on the host computer 101 (S1212 and S1213). When the piece of software has not been installed, the OS 122 newly installs the piece of software (S1214). When the piece of software has already been installed, the OS 122 performs update processing for the piece of software (S1215). The update processing may be processing of uninstalling the installed software and then installing the acquired software, or may be processing of replacing (overwriting) a file.

In S1216, the OS 122 adds 1 to the number of software to be subjected to update processing, and determines whether or not there is another piece of software to be updated (S1217). When there is another piece of software to be updated, the processing returns to S1212, and the OS 122 continues the processing. When there is no software to be updated, the OS 122 finishes the update processing. After the software is newly installed in S1214, the processing proceeds to S1217.

Whether or not the OS 172 or the application software 173 on the OS server 102 is to be set as software to be updated on the host computer 101 is determined based on various types of information, for example, based on time information of a file, or a software name or version information recorded inside the file.

[Printer Driver Update Processing]

Referring to FIG. 13, an example of processing of updating a printer driver by the OS 122 is described. First, after processing of installing the printer driver 201 is started, the OS 122 determines whether or not an identifier for identifying a device associated with the driver (e.g., device ID) is identical to a corresponding identifier of the installed printer driver 201 (S1301). When the identifiers of those printer drivers 201 are identical, the OS 122 determines whether or not model names of those printer drivers 201 are identical (S1302). In this processing, for example, it is determined whether or not the "types" of the printer details display area 503 of FIG. 5 ("ABC PDL1" in FIG. 5) are identical. When the model names are identical, the OS 122 determines that those printer drivers are the same printer driver, and displays, for example, a message for prompting the user of the host computer 101 to choose whether or not to allow the update of the printer driver (S1303). When the user does not wish to update (NO in S1304, for example, when the user clicks on a "cancel" or "No" button (not shown) in the message screen displayed in S1303), the OS 122 does not perform the update processing for the printer driver 201 (S1306). On the other hand, when the identifiers are different in S1301, or when the model names are different in S1302, the OS 122 performs the update processing for the printer driver 201 (S1305). This update processing is also performed when the user wishes to update in S1304 (YES in S1304, for example, when the user clicks on an "update" or "OK" button (not shown) in the above-mentioned screen) (S1305).

The printer driver update processing described above is performed not only at the time of installation from a software group downloaded from the OS server 102. For example, the printer driver update processing may also be performed when the printer driver 201 is installed through use of an installer of the printer driver 201. As another example, the printer driver update processing may also be performed when software is installed with "Plug and Play" provided by the OS 122 after the image forming apparatus 103 is connected to the host computer 101 by a Universal Serial Bus (hereinafter referred to as "USB") cable.

[OS and Software Architecture]

In recent years, OSes have been advancing drastically, and along with the advancement of OSes, the structure, architecture, and the like of software operating under the OS need to advance as well. FIG. 14A is a table for showing an example of a process of advancement of the OS 122 and generations of the architecture of software that can operate under the OS environment. As shown in FIG. 14A, under an OS of a version (shown as "Ver" in FIG. 14A and other figures) N, both of sixth-generation software and seventh-generation software can operate, but only the sixth-generation software can operate under an OS of a version N−1, and only the seventh-generation software can operate under an OS of a future version N+1.

FIG. 14B is a diagram for illustrating an example of a printer driver. Some of the printer drivers that are provided so as to be capable of being installed on the OS of the version N have a different model name because the architecture thereof is different. A screen 1410 is an example of a screen for displaying all print queues that have been installed (this screen is prepared by the OS 122, and is equivalent to the printer registration dialogue 501 of FIG. 5). This screen indicates that a printer driver 1411 is a six-generation ("generation" is represented as "Gen" in FIG. 14B and other figures) printer driver, and a printer driver 1412 is a seventh-generation printer driver. This screen also indicates that for a printer "A", the printer drivers of two generations are installed on the OS 122.

FIG. 14C is a table for showing an example of registration information 1420 at the time when the printer driver is registered with the OS 122. In FIG. 14C, an item 1421 indicates an identifier (e.g., device ID) for identifying uniqueness of a device, an item 1422 indicates a model name (model information) of the printer driver, and an item 1423 indicates a generation number (generation information) of the printer driver.

Figure 15:
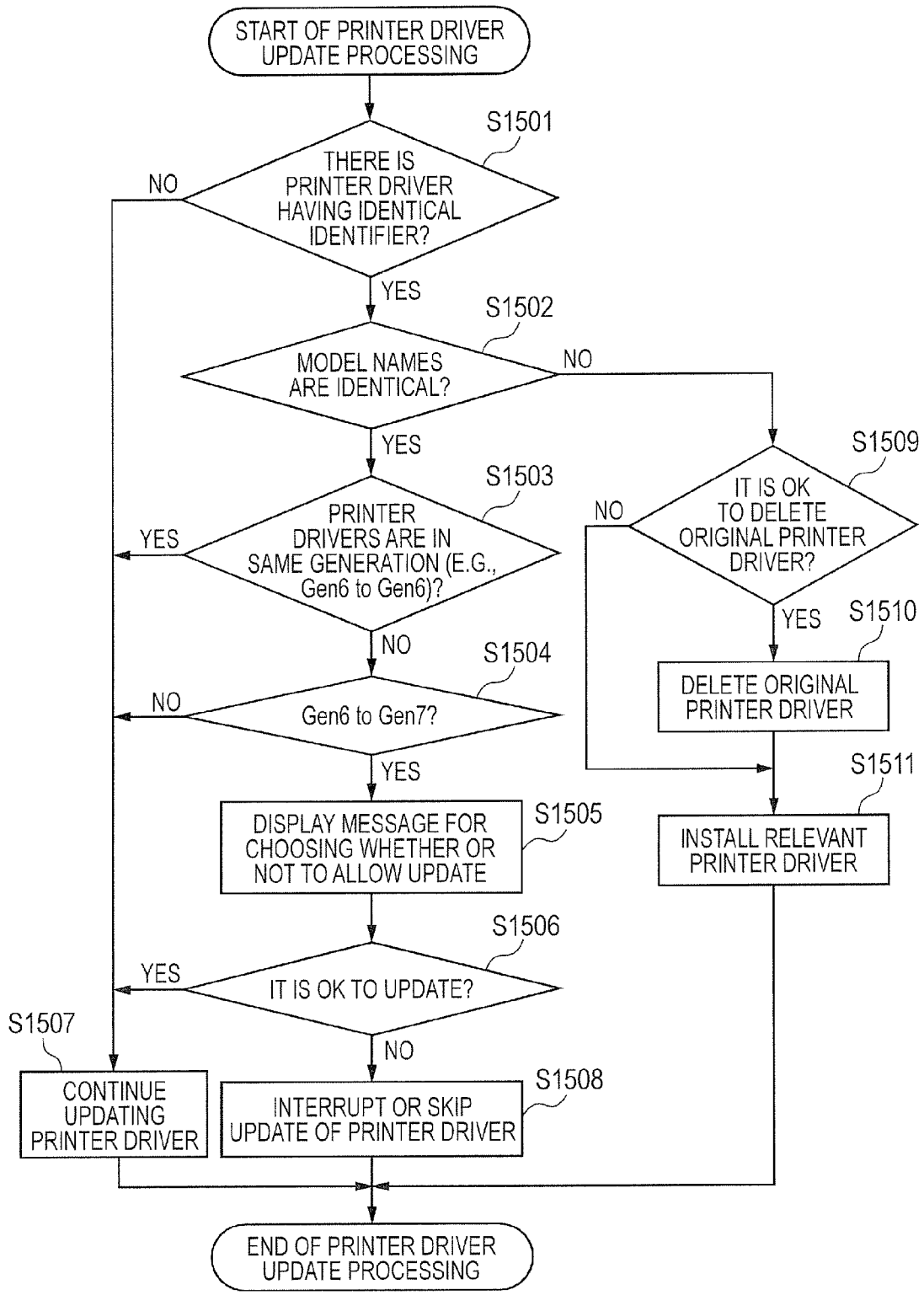
FIG. 15 a flowchart for illustrating processing according to the present invention.

Processing to be performed under the environment described above according to the present invention is described with reference to the flowchart FIG. 15. First, after the processing of installing the printer driver 201 is started, the OS 122 compares identifiers of the driver and the installed printer driver 201 to determine whether or not the two identifiers are identical (S1501, first comparison unit). This identifier is for identifying a device associated with each driver (1421 of FIG. 14C). When the identifiers are identical, the OS 122 compares model names (1422 of FIG. 14C) of those printer drivers 201 to determine whether or not the two model names are identical (S1502, second comparison unit). In this processing, for example, it is determined whether or not the "types" of the printer details display area 503 of FIG. 5 ("ABC PDL1" in FIG. 5) are identical. When the model names are identical, the OS 122 determines that those printer drivers are the same printer driver.

Next, the OS 122 compares generation numbers (1423 of FIG. 14C) of the original printer driver 201 before installation (printer driver 201 that has been installed on the OS) and the printer driver 201 to be updated to determine whether or not those drivers are the same generation (S1503, third comparison unit). When those drivers are the same generation, the processing proceeds to S1507. On the other hand, when those drivers are different generations, the OS 122 determines whether not the original printer driver 201 before installation is the sixth generation and the printer driver 201 to be updated is the seventh generation (S1504). When the printer driver 201 is to be updated from the sixth generation to the seventh generation, the OS 122 displays, for example, a message for prompting the user of the host computer 101 to choose whether or not to allow the update of the printer driver (S1505). In response to the user's instruction given to this message, the OS 122 determines whether or not to perform update processing. That is, when the user does not wish to update (No in S1506, for example, when the user clicks on a "cancel" or "No" button (not shown) in the message screen displayed in S1505), the OS 122 does not perform the update processing for the printer driver 201 (S1508). On the other hand, when the user wishes to update (YES in S1506, for example, when the user clicks on an "update" or "OK" button (not shown) in the above-mentioned screen), the OS 122 performs the update processing for the printer driver 201 (S1507). Further, also when the identifiers are different in S1501, the generations are identical in S1503, or the printer driver 201 is not to be updated from the sixth generation to the seventh generation in S1504, the OS 122 performs the update processing for the printer driver 201 (S1507).

As described above, through execution of the processing that takes into consideration a generation number (generation information) of the printer driver 201, even when there are printer drivers 201 having different generation numbers, software can be updated automatically, or depending on the user's decision to be made.

When the model names are different in S1502, the OS 122 displays a message for prompting the user to choose whether not to allow deletion of the original (installed) printer driver, and determines whether or not to delete the original printer driver based on the user's choice (S1509). When the user desires the deletion (e.g., when the user clicks on a "delete" or "OK" button (not shown) in the message screen displayed in S1509), the OS 122 deletes the original (installed) printer driver (S1510). On the other hand, when the user does not desire the deletion (e.g., when the user clicks on a "cancel" or "NO" button (not shown) in the above-mentioned screen), the OS 122 installs the printer driver to be installed (S1511). In the latter case, different printer drivers are installed for the same printer.

Figure 16:
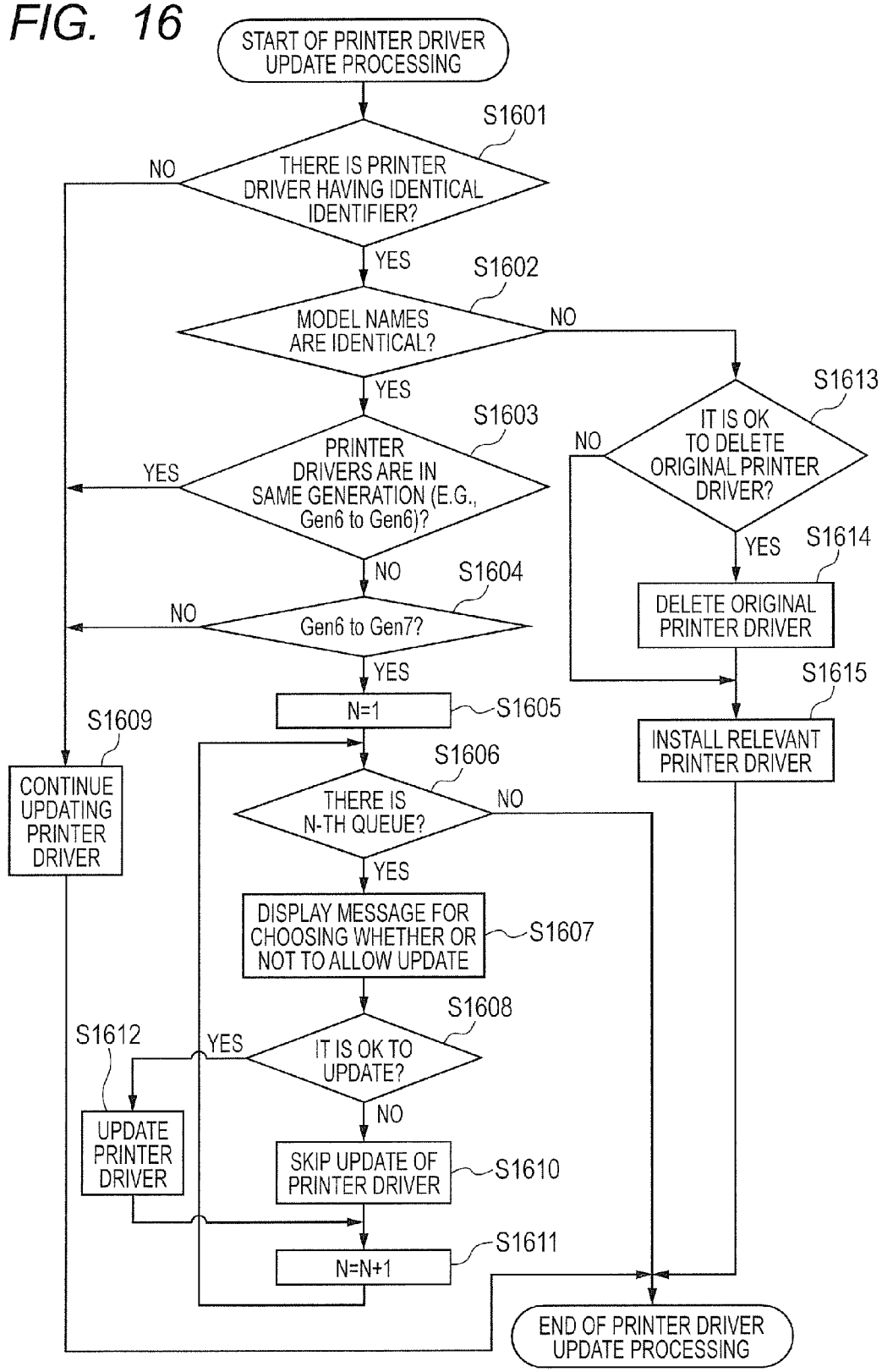
FIG. 16 is a flowchart for illustrating processing according to the present invention.

Next, referring to FIG. 16, a flow of performing the update processing for the printer driver not in units of the printer driver but in units of the print queue 502 is described. The processing of S1601 to S1604 is the same as that of S1501 to S1504 of FIG. 15 and the processing of S1613 to S1615 is the same as that of S1509 to S1511 of FIG. 15, and hence a description thereof is omitted.

When determining in S1604 that the printer driver 201 is to be updated from the sixth generation to the seventh generation, the OS 122 assigns a count N (an initial value thereof is N=1) so that update processing for the relevant printer driver is selected for each queue, and starts selection processing from an N-th queue (S1605). Then, the OS 122 determines whether or not the N-th queue exists (S1606). When the N-th queue exists, the OS 122 displays, for example, a message for prompting the user of the host computer 101 to choose whether or not to allow update processing for the queue (S1607). When the user does not wish to update (NO in S1608, for example, when the user clicks on a "cancel" or "No" button (not shown) in the message screen displayed in S1607), the OS 122 does not perform the update processing for the printer driver 201 (S1610). When the user wishes to update (YES in S1608, for example, when the user clicks on an "update" or "OK" button (not shown) in the above-mentioned screen), the OS 122 performs the update processing for the printer driver 201 (S1612). Then, the OS 122 increments the count by 1 (S1611), and the processing returns to S1606.

On the other hand, also when the identifiers are different in S1601, the generations are identical in S1603, or the printer driver 201 is not to be updated from the sixth generation to the seventh generation in S1604, the OS 122 performs the update processing for the printer driver 201 (S1609).

Figure 17:
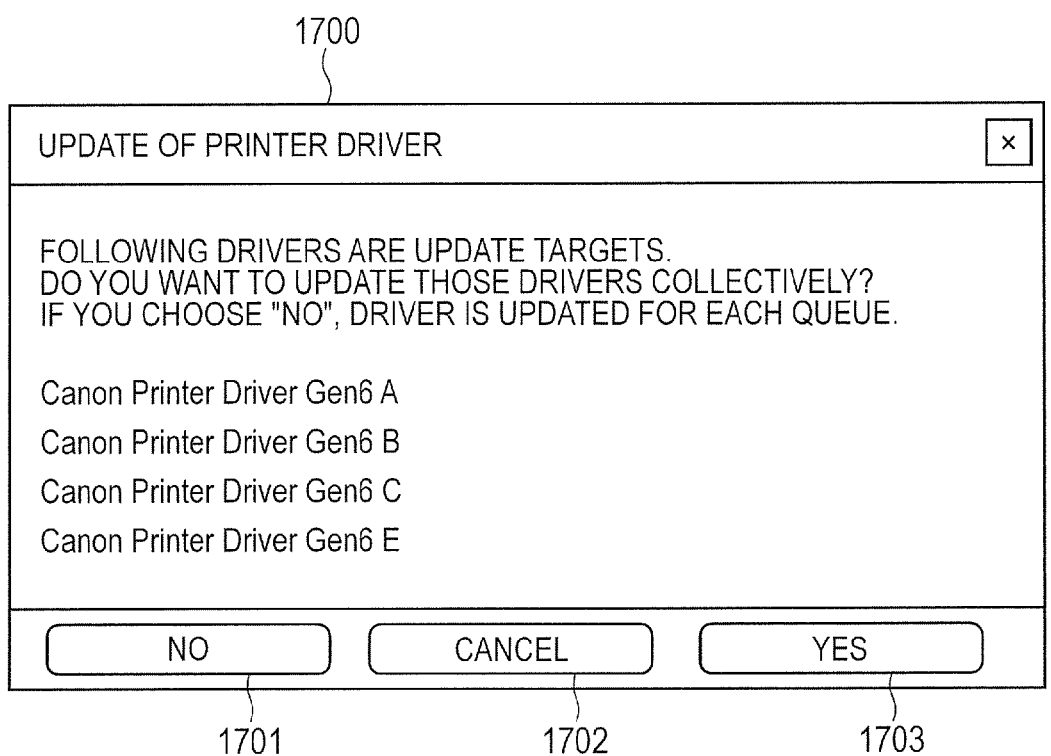
FIG. 17 is a diagram for illustrating an example of display at the time of printer driver update according to the present invention.

In the processing of S1607 for the first queue, a screen illustrated in FIG. 17 may be displayed. In a screen 1700, for a printer driver having a plurality of queues, it can be chosen whether to perform update processing for those listed queues collectively, or to perform update processing for each queue. When a "No" button 1701 of the screen 1700 is clicked on, as described above with reference to FIG. 16, driver update processing is performed for each queue. On the other hand, when a "Yes" button 1703 is clicked on, update processing is performed for all of the relevant print queues. When a "Cancel" button 1702 is clicked on in this case, the processing of S1610 is performed.

Further, as the registration information of the printer driver in the OS 122, a flag (not shown) indicating whether or not to allow, when update processing is automatically performed, automatic update may be prepared by, for example, downloading the printer driver from the OS server 102. FIG. 18A is a diagram for illustrating a screen display example of a printer driver installer to be displayed when items necessary for installation of the printer driver are input under this environment (S404). When in a screen 1800 an "Exclude from Target of Automatic Update" checkbox 1801 is checked, a "Next" button 1803 is clicked on, and the printer driver is then installed, the relevant printer driver is excluded from the printer drivers to be updated in the OS 122 through setting of the above-mentioned flag. In this case, for example, the following processing is performed: the relevant printer driver is excluded from the printer drivers to be updated in the processing of FIG. 15 or FIG. 16, or is not displayed in the list of FIG. 17. As shown in FIG. 18B, the setting of automatic update can be made for each print queue, and hence whether or not the installed printer driver can be updated can be set for each queue.

While a description is given through use of the printer drivers of the sixth generation and the seventh generation in this embodiment, this is merely an example. Determination may be made based on a relationship between an old generation and a new generation, or on a relationship between printer drivers having information that enables determination that those printer drivers have different architectures.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-143810, filed Jul. 21, 2015, which is hereby incorporated by reference herein in its entirety.

What is claimed is:

1. An information processing apparatus having an operating system on which a plurality of device drivers with different structures are installable, comprising:
a memory storing instructions related to the operating system; and
a processor which is capable of executing the instructions causing the information processing apparatus to:
perform a first comparison to compare an identifier for identifying a device associated with a device driver that has been installed on the information processing apparatus and an identifier for identifying a device to be associated with a device driver to be updated;
install the device driver to be updated and associate the installed device driver to be updated with the device identified by the identifier when it is determined based on the first comparison that the two identifiers are different;
display a message for inquiring a user of whether or not to update the device driver that has been installed with the device driver to be updated when it is determined based on the first comparison that the two identifiers are identical, and the structure of the device driver that has been installed is different from the structure of the device driver to be updated; and
update the device driver that has been installed, by the device driver that is to be updated and of which the structure is different from the structure of the device driver that has been installed, when the user gives an instruction for choosing the update to the displayed message.

2. An information processing apparatus according to claim 1, wherein the instructions further cause the information processing apparatus to:
perform a second comparison to compare a piece of model information indicating a model of the device driver that has been installed and a corresponding piece of model information of the device driver to be updated;
install the device driver to be updated when it is determined based on the first comparison that the two identifiers are identical, and when it is determined based on the second comparison that the two pieces of model information are different;
perform a third comparison to compare, when it is determined based on the first comparison that the two identifiers are identical, and when it is determined based on the second comparison that the two pieces of model information are identical, a piece of generation information indicating a generation of the device driver that has been installed and a corresponding piece of generation information of the device driver to be updated;
determine based on the third comparison whether or not the structure of the device driver that has been installed is different from the structure of the device driver to be updated;
update the device driver that has been installed with the device driver to be updated when it is not determined that the structure of the device driver that has been installed is different from the structure of the device driver to be updated; and
display the message when it is determined that the structure of the device driver that has been installed is different from the structure of the device driver to be updated.

3. An information processing apparatus according to claim 1, wherein the instructions further cause the information processing apparatus to avoid updating the device driver when the instruction does not choose the update.

4. An information processing apparatus according to claim 2, wherein the instructions further cause the information processing apparatus to display, at a time of installing the device driver to be updated, when it is determined based on the first comparison that the two identifiers are identical, and when it is determined based on the second comparison that the two pieces of model information are different, a second message for inquiring the user of whether or not to delete the device driver that has been installed.

5. An information processing apparatus according to claim 4, wherein the instructions further cause the information processing apparatus to delete, when an instruction of the user given to the second message chooses the deletion, the device driver that has been installed and install the device driver to be updated.

6. An information processing apparatus according to claim 1, wherein the instructions further cause the information processing apparatus to display, when it is determined based on the first comparison that the two identifiers are identical, and when it is determined based on the second comparison that the two pieces of model information are identical, a third message for inquiring the user of whether or not to update the device driver for each print queue.

7. An information processing apparatus according to claim 6, wherein the instructions further cause the information processing apparatus to display a fourth message for inquiring the user of whether or not to collectively update all print queues for one device driver.

8. An information processing apparatus according to claim 7, wherein the instructions further cause the information processing apparatus to display a fifth message for inquiring the user of whether or not to automatically update each device driver.

9. An information processing apparatus according to claim 1, wherein the update of the device driver is controlled based on software provided from one of an external server and an image forming apparatus.

10. An information processing apparatus according to claim 1, wherein the device driver comprises a printer driver.

11. An information processing method carried out in an information processing apparatus having an operating system on which a plurality of device drivers with different structures are installable, the information processing method comprising:
   comparing an identifier for identifying a device associated with a device driver that has been installed on the information processing apparatus and an identifier for identifying a device to be associated with a device driver to be updated;
   installing the device driver to be updated and associating the installed device driver to be updated with the device identified by the identifier when it is determined in the comparing that the two identifiers are different;
   displaying a message for inquiring a user of whether or not to update the device driver that has been installed with the device driver to be updated when it is determined in the comparing that the two identifiers are identical, and the structure of the device driver that has been installed is different from the structure of the device driver to be updated; and
   updating the device driver that has been installed, by the device driver that is to be updated and of which the structure is different from the structure of the device driver that has been installed, when the user gives an instruction for choosing the update to the displayed message.

12. A non-transitory computer-readable storage medium having stored thereon a program for causing a computer to execute an information processing method carried out in an information processing apparatus having an operating system on which a plurality of device drivers with different structures are installable,
   the information processing method comprising:
   comparing an identifier for identifying a device associated with a device driver that has been installed on the information processing apparatus and an identifier for identifying a device to be associated with a device driver to be updated;
   installing the device driver to be updated and associating the installed device driver to be updated with the device identified by the identifier when it is determined in the comparing that the two identifiers are different;
   displaying a message for inquiring a user of whether or not to update the device driver that has been installed with the device driver to be updated when it is determined in the comparing that the two identifiers are identical, and the structure of the device driver that has been installed is different from the structure of the device driver to be updated; and
   updating the device driver that has been installed, by the device driver that is to be updated and of which the structure is different from the structure of the device driver that has been installed, when the user gives an instruction for choosing the update to the displayed message.

13. An information processing apparatus according to claim 7, wherein an operating system of the image processing apparatus includes a first drive architectures for driving the device driver with a first structure and a second drive architectures for driving the device driver with a second structure different from the first structure, and
   the message for inquiring the user of whether or not to replace the device driver that has been installed with the device driver to be updated is displayed, when it is determined based on the first comparison that the two identifiers are identical, and when the structure of the device driver that has been installed is different from the structure of the device driver to be updated and a type of drive architectures is changed.

* * * * *